United States Patent
Huang

(10) Patent No.: US 10,465,737 B2
(45) Date of Patent: Nov. 5, 2019

(54) QUICK LOCK ASSEMBLY

(71) Applicant: Chun-Po Huang, Chunghua (TW)

(72) Inventor: Chun-Po Huang, Chunghua (TW)

( * ) Notice: Subject to any disclaimer, the term of this patent is extended or adjusted under 35 U.S.C. 154(b) by 210 days.

(21) Appl. No.: 15/839,134

(22) Filed: Dec. 12, 2017

(65) Prior Publication Data

US 2019/0178280 A1 Jun. 13, 2019

(51) Int. Cl.
 *F16B 37/08* (2006.01)
 *F16B 37/04* (2006.01)
 *F16B 2/06* (2006.01)

(52) U.S. Cl.
 CPC ........ *F16B 37/0864* (2013.01); *F16B 37/041* (2013.01); *F16B 37/045* (2013.01); *F16B 37/0885* (2013.01); *F16B 2/065* (2013.01); *F16B 37/08* (2013.01)

(58) Field of Classification Search
 CPC .......... F16B 2/065; F16B 23/00; F16B 37/00; F16B 37/041; F16B 37/045; F16B 37/08; F16B 37/0821; F16B 37/0835; F16B 37/0864; F16B 37/0885; F16B 37/0892
 USPC ................. 411/427, 432, 433, 434
 See application file for complete search history.

(56) References Cited

U.S. PATENT DOCUMENTS

| | | | | |
|---|---|---|---|---|
| 1,510,492 A * | 10/1924 | Caron | ................. | F16B 37/0885 411/432 |
| 2,664,023 A * | 12/1953 | Mugford | ............ | F16B 37/0885 411/433 |
| 3,815,434 A * | 6/1974 | Seger | ...................... | E04G 25/06 74/424.79 |
| 4,462,731 A * | 7/1984 | Rovinsky | ............ | F16B 37/0892 269/173 |
| 4,863,198 A * | 9/1989 | Petranto | ............. | F16L 19/0231 285/39 |
| 5,226,678 A * | 7/1993 | Petranto | ............. | F16L 19/0231 285/334.5 |
| 5,921,734 A * | 7/1999 | Kataoka | .................. | F16B 35/02 411/269 |
| 6,953,314 B2 * | 10/2005 | Magagna | .............. | E03C 1/0401 411/301 |
| 8,272,083 B1 * | 9/2012 | Liston | ................... | E03C 1/0401 137/606 |
| 8,398,351 B2 * | 3/2013 | Hohmann | ........... | F16B 37/0821 411/432 |
| 8,657,547 B2 * | 2/2014 | Herndon | ............. | F16L 19/0231 411/432 |

(Continued)

*Primary Examiner* — Roberta S Delisle

(57) ABSTRACT

A quick lock assembly contains: a locker and a drive socket. The locker includes two clamp elements and a C flexible retainer, each clamp element has a semicircular clamping portion, a press extension, and a rotatable connection portion. The semicircular clamping portion has two semicircular grooves so that when the two clamp elements are connected, two circular orifices are formed by four semicircular grooves of the two clamp elements. Each semicircular groove has inner threads so that when the two clamp elements are connected, the four semicircular grooves retain with a screw rod, and inner threads of the four semicircular grooves screw with outer threads of the screw rod. The C flexible retainer retains the two semicircular clamping portions. The drive socket includes a fitting portion and a driving portion, the fitting portion has an accommodation chamber with a recess, and the driving portion has an aperture.

8 Claims, 8 Drawing Sheets

(56) References Cited

U.S. PATENT DOCUMENTS

2009/0162166 A1* 6/2009 Hohmann ........... F16B 37/0821
411/433

* cited by examiner

QUICK LOCK ASSEMBLY

FIELD OF THE INVENTION

The present invention relates to a quick lock assembly which is employed to lock and screw with a screw rod quickly and easily.

BACKGROUND OF THE INVENTION

A conventional quick locker for a screw rod contains a first clamp element and a second clamp element which are connected by a C flexible retainer, hence a first press extension of the first clamp element and a second press extension of the second clamp element are pressed so that the quick locker clamp on a locking position of the screw rod, and first threads of a first semicircular groove of the first clamp element and second threads of a second semicircular groove of the second clamp element screw with outer threads of the screw rod, thus locking the quick locker on the screw rod.

However, a first clamping portion of the first clamp element and a second clamping portion of the second clamp element are semicircular, so it is not easy for a wrench or other clamping tools to rotate the quick locker.

The present invention has arisen to mitigate and/or obviate the afore-described disadvantages.

SUMMARY OF THE INVENTION

The primary aspect of the present invention is to provide a quick lock assembly which is employed to lock and screw with a screw rod quickly and easily.

To obtain above-mentioned aspect, a quick lock assembly provided by the present invention contains: a locker and a drive socket.

The locker includes two clamp elements and a C flexible retainer, each of the two clamp elements has a semicircular clamping portion, a press extension extending outward from one end of the semicircular clamping portion, and a rotatable connection portion formed between the semicircular clamping portion and the press extension. The semicircular clamping portion of each clamp element has two semicircular grooves defined on a top and a bottom of a semicircular inner wall thereof respectively so that when the two clamp elements are connected, two circular orifices are formed by four semicircular grooves of the two clamp elements, wherein each of the two semicircular grooves has inner threads formed on an inner wall thereof so that when the two clamp elements are connected, the four semicircular grooves retain with a screw rod and inner threads of the four semicircular grooves screw with outer threads of the screw rod, wherein when the two clamp elements are connected, an angle is defined between two press extensions of the two clamp elements, and when the two press extensions of the locker are pressed, the two semicircular clamping portions rotate along two rotatable connection portions of the two clamp elements so as to expand or retract the two semicircular clamping portions, and the C flexible retainer retains the two semicircular clamping portions so that the two semicircular clamping portions are connected.

The drive socket includes a fitting portion and a driving portion extending outward from a center of a top of the drive socket, the fitting portion has an accommodation chamber formed in a bottom of the fitting portion so as to retain with the two semicircular clamping portions of the locker, and the accommodation chamber has a recess defined on a peripheral wall of the accommodation chamber so that the two press extensions of the locker retain with and extend out of the recess, wherein the driving portion is a polygonal column and has an aperture formed on a top of the driving portion and communicating with the accommodation chamber.

DETAILED DESCRIPTION OF THE PREFERRED EMBODIMENTS

Figure 1:
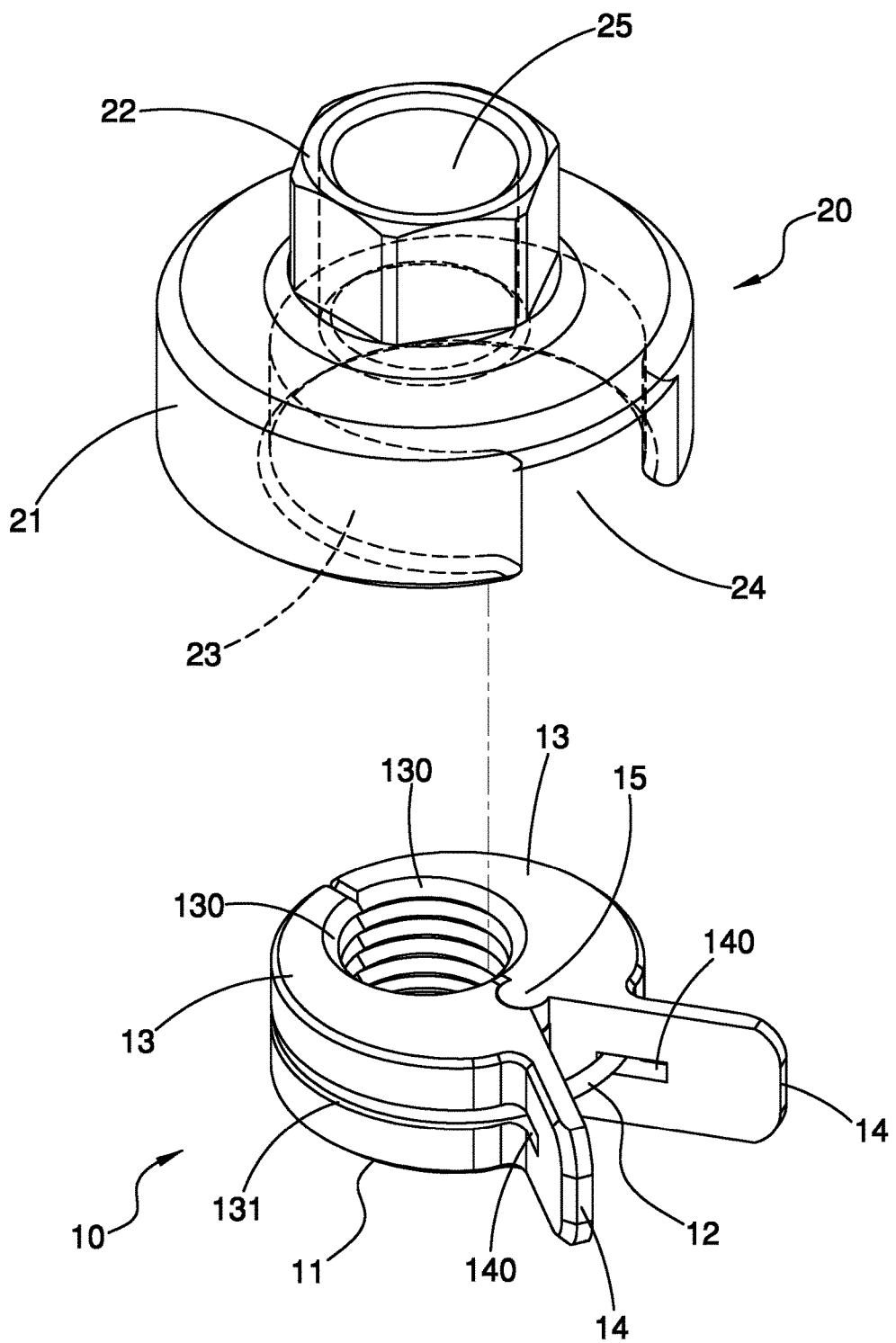
FIG. 1 is a perspective view showing the exploded components of a quick lock assembly according to a preferred embodiment of the present invention.
Figure 2:
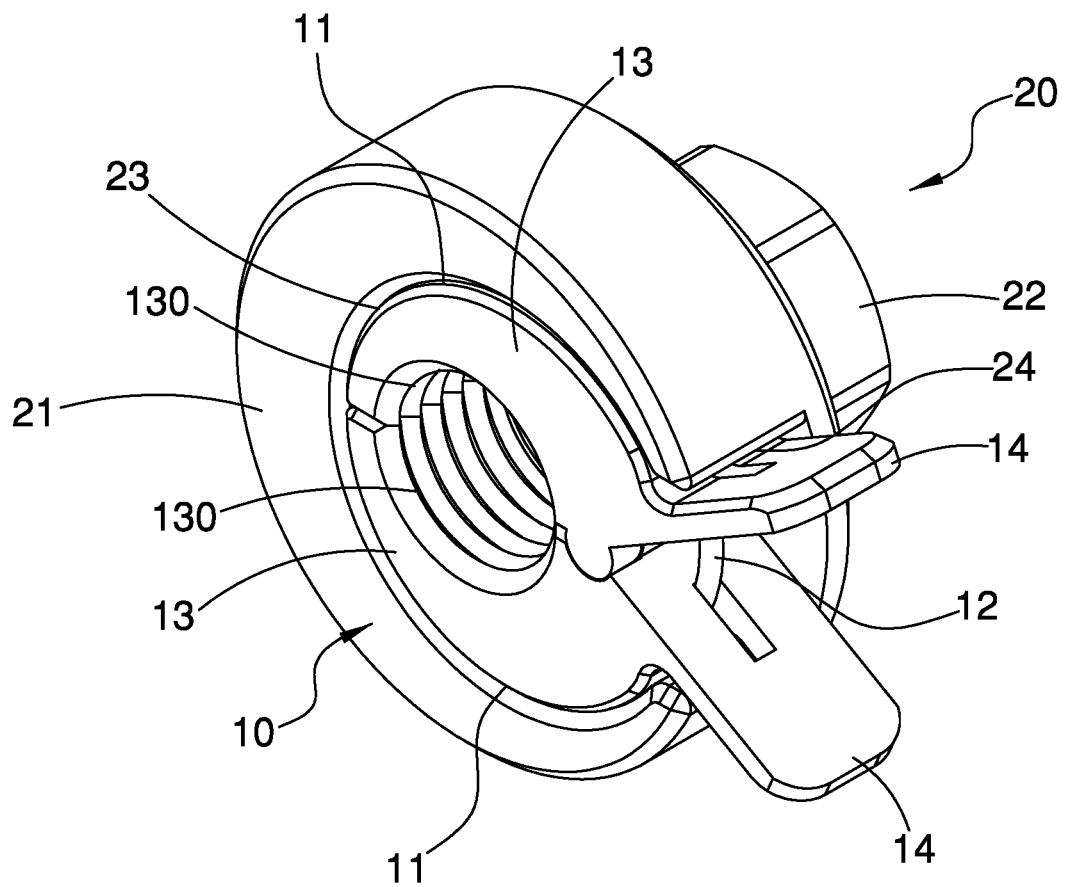
FIG. 2 is a perspective view showing the assembly of the quick lock assembly according to the preferred embodiment of the present invention.
Figure 3:
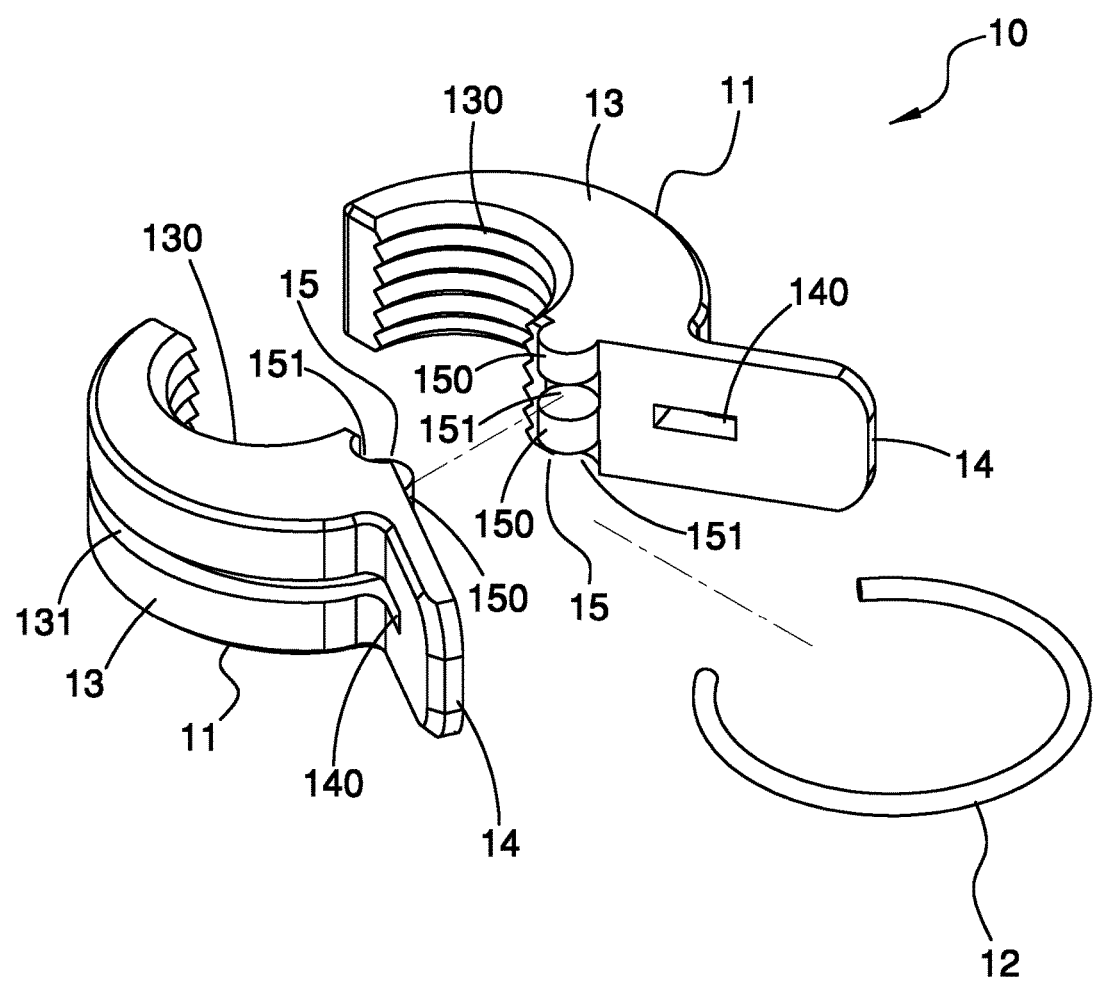
FIG. 3 is a perspective view showing the exploded components of a part of the quick lock assembly according to the preferred embodiment of the present invention.
Figure 4:
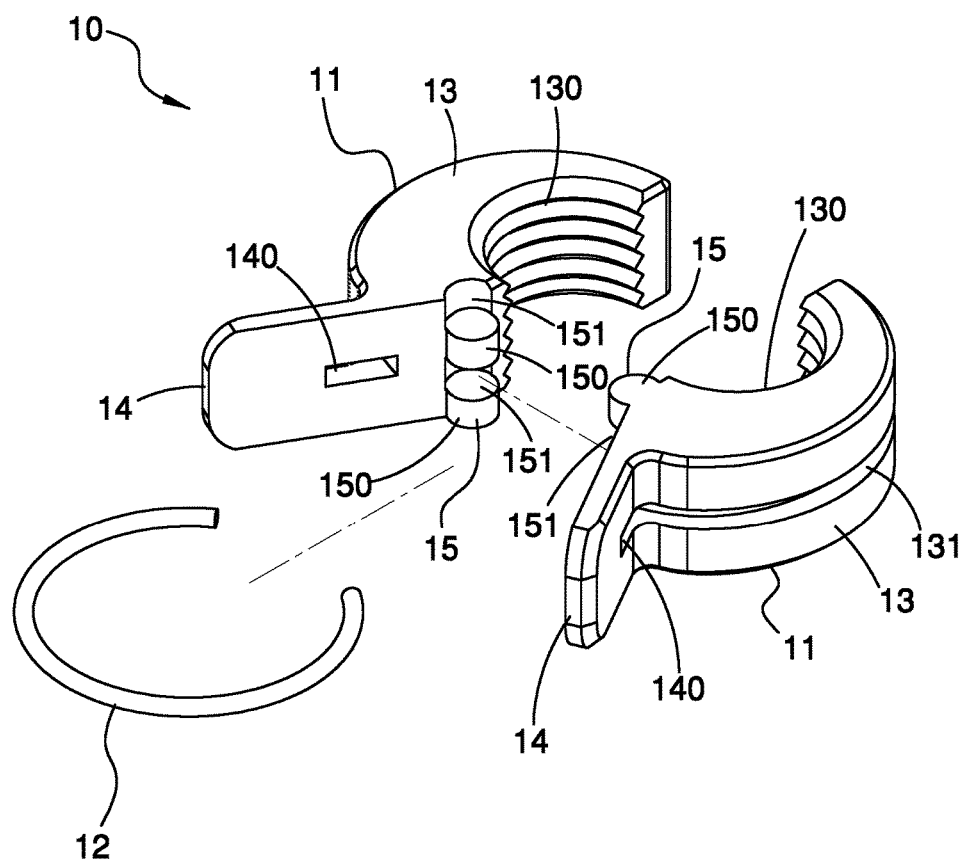
FIG. 4 is another perspective view showing the exploded components of a part of the quick lock assembly according to the preferred embodiment of the present invention.
Figure 5:
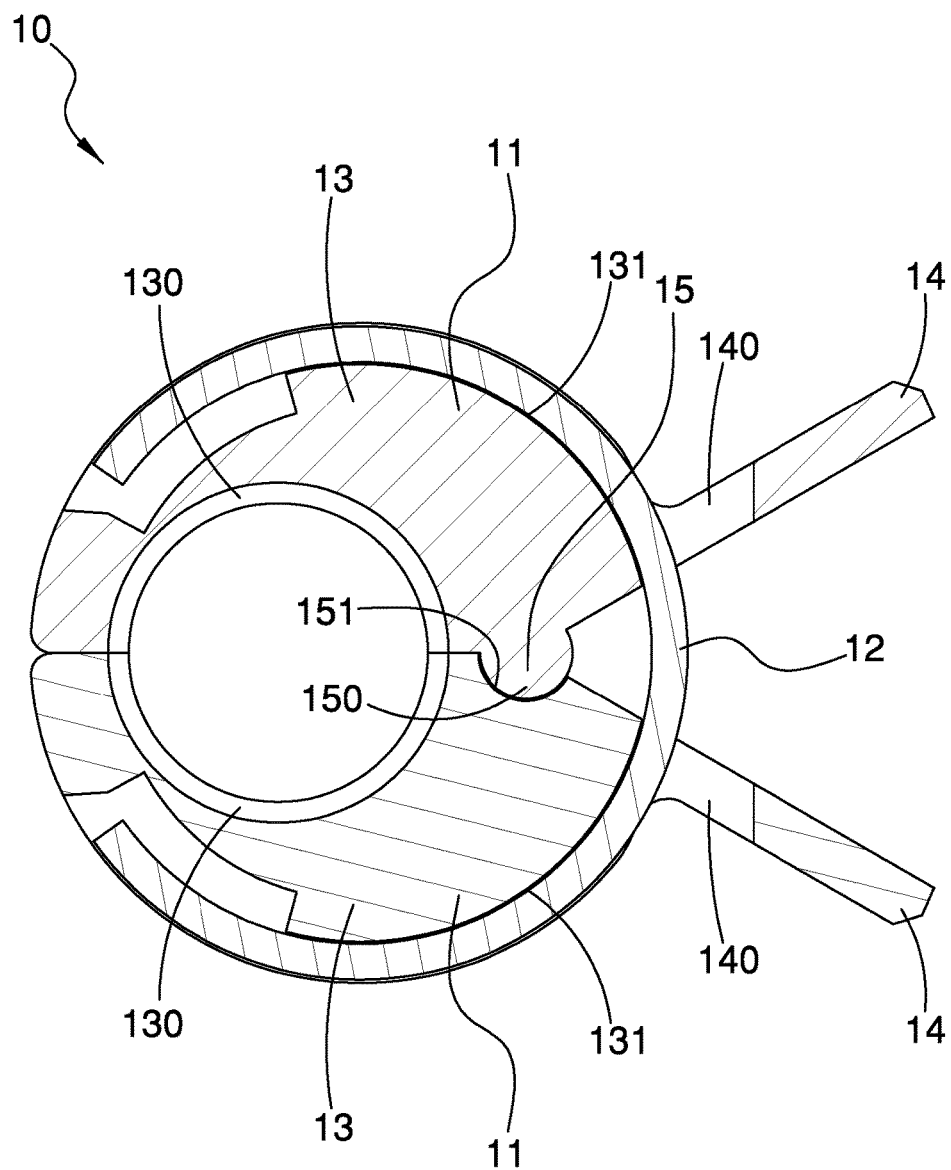
FIG. 5 is a cross sectional view showing the assembly of a part of the quick lock assembly according to the preferred embodiment of the present invention.

With reference to FIGS. 1-5, a quick lock assembly according to a preferred embodiment of the present invention comprises: a locker 10 and a drive socket 20.

The locker 10 includes two clamp elements 11 and a C flexible retainer 12. Each of the two clamp elements 11 has a semicircular clamping portion 13, a press extension 14 extending outward from one end of the semicircular clamping portion 13, and a rotatable connection portion 15 formed between the semicircular clamping portion 13 and the press extension 14. The semicircular clamping portion 13 of each clamp element 11 has two semicircular grooves 130 defined on a top and a bottom of a semicircular inner wall thereof respectively so that when the two clamp elements 11 are connected together, two circular orifices are formed by four semicircular grooves 130 of the two clamp elements 11, wherein the two semicircular grooves 130 of each clamp element 11 are away from and eccentric with the press extension 14, each of the two semicircular grooves 130 has inner threads formed on an inner wall thereof so that when the two clamp elements 11 are connected together, the four semicircular grooves 130 retain with a screw rod 30 and inner threads of the four semicircular grooves 130 screw with outer threads of the screw rod 30. The semicircular clamping portion 13 of each clamp element 11 has a peripheral trench 131 defined on a semicircular outer wall thereof. The press extension 14 of each clamp element 11 has a through hole 140 communicating with the peripheral trench 131, and when the two clamp elements 11 are connected together, an angle is defined between two press extensions 14 of the two clamp elements 11, wherein the angle is within 50 to 90 degrees. The rotatable connection portion 15 of each clamp element 11 is located on one end of the semicircular clamping portion 13 proximate to the express extension 14, and the rotatable connection portion 15 has at least one coupling protrusion 150 and at least one notch 151 which are separated from one another, hence the two clamp elements 11 are rotatably connected by way of the at least one coupling protrusion 150 and the at least one notch 151 of each clamp element 11, and the two clamp elements 11 are expanded or retracted along two rotatable connection portions 15 of the two clamp elements 11. Two ends of the C flexible retainer 12 retain in two peripheral trenches 131 of the two clamp elements 11 via two through holes 140 of the two clamp elements 11 individually, thus clamping two semicircular clamping portions 13 of the two clamp elements 11.

The drive socket 20 includes a fitting portion 21 and a driving portion 22 extending outward from a center of a top thereof. The fitting portion 21 has an accommodation chamber 23 eccentrically formed in a bottom thereof so as to retain with the two semicircular clamping portions 13 of the locker 10, and the accommodation chamber 23 has a recess 24 defined on a peripheral wall thereof so that the two press extensions 14 of the locker 10 retain with and extend out of the recess 24. The driving portion 22 is a polygonal column and has an aperture 25 formed on a top of the driving portion 22 and communicating with the accommodation chamber 23, wherein the aperture 25 of the driving portion 22 is centric with the two circular orifices which are formed by the four semicircular grooves 130 of the two clamp elements 11, such that the screw rod 30 inserts through the aperture 25. In this embodiment, the driving portion 22 is in a hexagon shape. In another embodiment, the driving portion 22 is in any one of a square shape, a polygon shape, a star shape, and a plum shape.

Shapes of the two clamp elements 11 are identical.

The C flexible retainer 12 is made of metal material.

Figure 6:
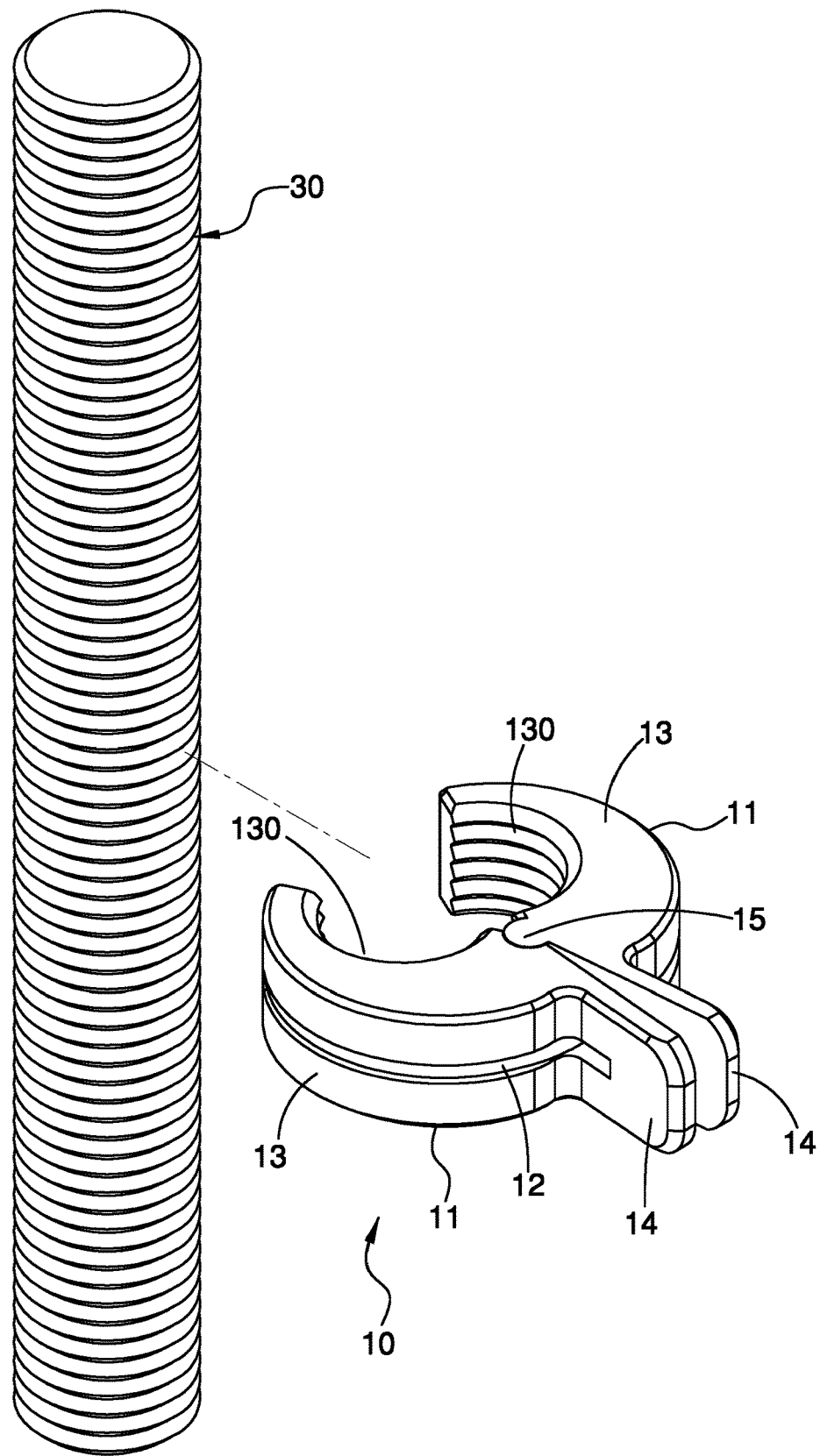
FIG. 6 is a perspective view showing the application of the quick lock assembly according to the preferred embodiment of the present invention.
Figure 7:
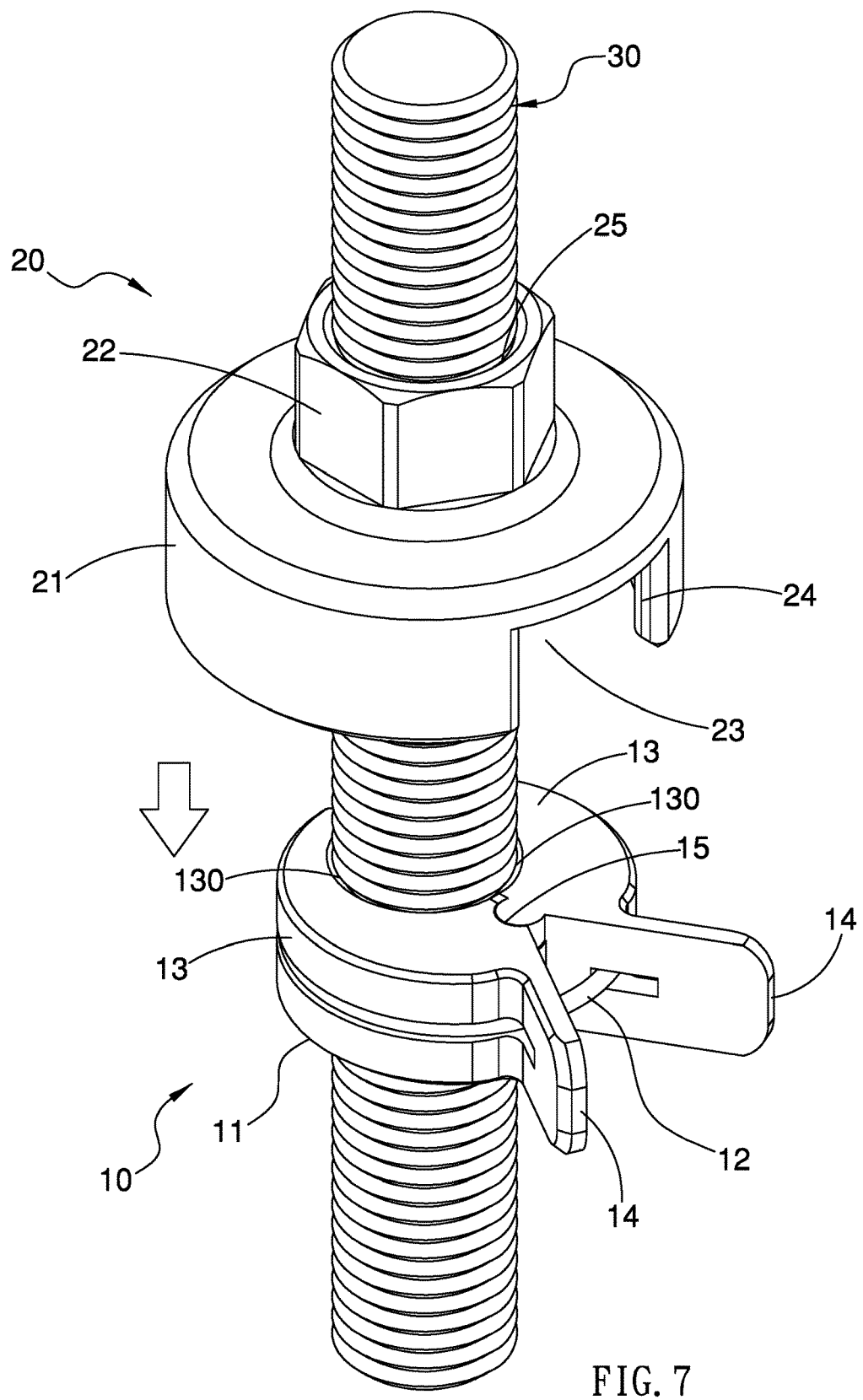
FIG. 7 is another perspective view showing the application of the quick lock assembly according to the preferred embodiment of the present invention.

In operation, as shown in FIGS. 6 and 7, when the two press extensions 14 of the locker 10 are pressed to close to each other, the two semicircular clamping portions 13 rotate outward along the two rotatable connection portions 15 of the two clamp elements 11 so as to expand the C flexible retainer 12 outwardly, and the inner threads of the four semicircular grooves 130 of the two clamp elements 11 are away from the screw rod 30, the locker 10 is moved to a locking position. Thereafter, the two press extensions 14 of the locker 10 are released so that the C flexible retainer 12 forces the two semicircular clamping portions 13 to clamp the screw rod 30, hence the inner threads of the four semicircular grooves 130 of the two clamp elements 11 screw with the outer threads of the screw rod 30, thus moving the locker 10 to the locking position. As desiring to unlock the locker 10, the two press extensions 14 of the locker 10 are pressed so that the two semicircular clamping portions 13 of the locker 10 unclamp the screw rod 30, thus unlocking the locker 10 quickly.

Figure 8:
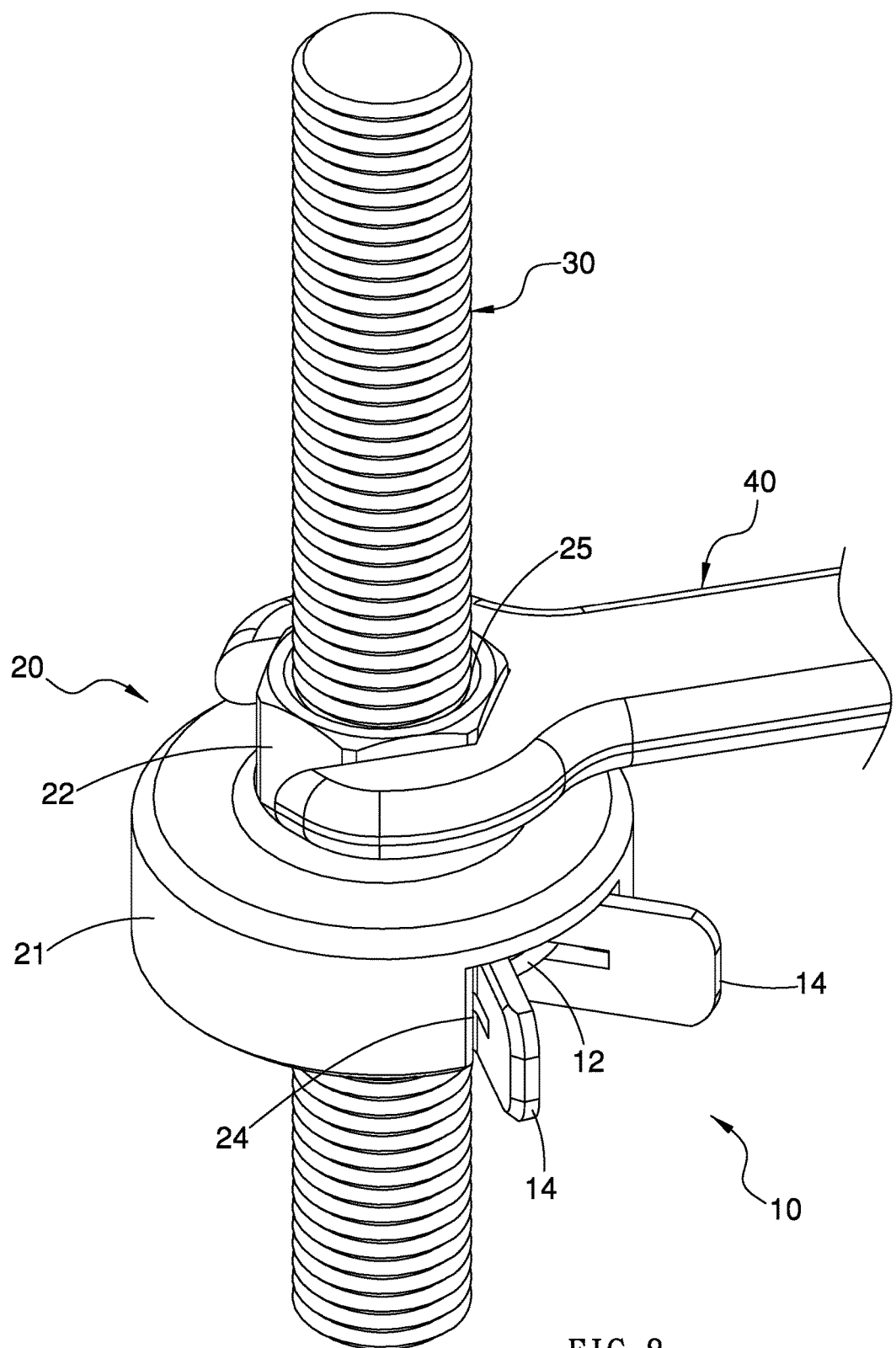
FIG. 8 is also another perspective view showing the application of the quick lock assembly according to the preferred embodiment of the present invention.

With reference to FIGS. 7 and 8, when the screw rod 30 inserts through the aperture 25 of the drive socket 20, the accommodation chamber 23 of the drive socket 20 retains with the two semicircular clamping portions 13 of the locker 10, and the two press extensions 14 engage in the recess 24, a wrench 40 or other clamping tools clamp the driving portion 22 so as to rotate the drive socket 20 forcefully, and the drive socket 20 drives the locker 10 to revolve so that the drive socket 20 stops outward expansion of the locker 10 on the screw rod 30, thus locking the locker 10 easily and quickly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A quick lock assembly comprising:
    a locker including two clamp elements and a C flexible retainer, each of the two clamp elements having a semicircular clamping portion, a press extension extending outward from one end of the semicircular clamping portion, and a rotatable connection portion formed between the semicircular clamping portion and the press extension, wherein the semicircular clamping portion of each clamp element has two semicircular grooves defined on a top and a bottom of a semicircular inner wall thereof respectively so that when the two clamp elements are connected, two circular orifices are formed by four semicircular grooves of the two clamp elements, wherein each of the two semicircular grooves has inner threads formed on an inner wall thereof so that when the two clamp elements are connected, the four semicircular grooves retain with a screw rod and inner threads of the four semicircular grooves screw with outer threads of the screw rod, wherein when the two clamp elements are connected, an angle is defined between two press extensions of the two clamp elements, and when the two press extensions of the locker are pressed, the two semicircular clamping portions rotate along two rotatable connection portions of the two clamp elements so as to expand or retract the two semicircular clamping portions, and the C flexible retainer retains the two semicircular clamping portions so that the two semicircular clamping portions are connected; and
    a drive socket including a fitting portion and a driving portion extending outward from a center of a top of the drive socket, the fitting portion having an accommodation chamber formed in a bottom of the fitting portion so as to retain with the two semicircular clamping portions of the locker, and the accommodation chamber having a recess defined on a peripheral wall of the accommodation chamber so that the two press extensions of the locker retain with and extend out of the recess, wherein the driving portion is a polygonal column and has an aperture formed on a top of the driving portion and communicating with the accommodation chamber.

2. The quick lock assembly as claimed in claim 1, wherein the two semicircular grooves of each clamp element are away from and eccentric with the press extension, and the accommodation chamber is eccentrically formed in a bottom of the fitting portion.

3. The quick lock assembly as claimed in claim 2, wherein the semicircular clamping portion of each clamp element has a peripheral trench defined on a semicircular outer wall thereof, and the press extension of each clamp element has a through hole communicating with the peripheral trench, wherein two ends of the C flexible retainer retain in two peripheral trenches of the two clamp elements via two through holes of the two clamp elements individually.

4. The quick lock assembly as claimed in claim 3, wherein the rotatable connection portion of each clamp element is located on one end of the semicircular clamping portion proximate to the express extension, and the rotatable connection portion has at least one coupling protrusion and at least one notch which are separated from one another, hence the two clamp elements are rotatably connected by way of the at least one coupling protrusion and the at least one notch of each clamp element, and the two clamp elements are expanded or retracted along the two connection portions of the two clamp elements.

5. The quick lock assembly as claimed in claim 4, wherein shapes of the two clamp elements are identical.

6. The quick lock assembly as claimed in claim 4, wherein the driving portion is in a hexagon shape.

7. The quick lock assembly as claimed in claim 4, wherein the angle between the two press extensions of the two clamp elements is 50 to 90 degrees.

8. The quick lock assembly as claimed in claim 4, wherein the C flexible retainer is made of metal material.

\* \* \* \* \*